(12) United States Patent
Zhao (10) Patent No.: US 11,968,433 B2
(45) Date of Patent: Apr. 23, 2024

(54) SYSTEMS AND METHODS FOR GENERATING SYNTHETIC VIDEOS BASED ON AUDIO CONTENTS

(71) Applicant: Realsee (Beijing) Technology Co., Ltd., Beijing (CN)

(72) Inventor: Jing Zhao, Beijing (CN)

(73) Assignee: REALSEE (BEIJING) TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/722,258

(22) Filed: Apr. 15, 2022

(65) Prior Publication Data

US 2022/0345796 A1    Oct. 27, 2022

(30) Foreign Application Priority Data

Apr. 22, 2021  (CN) .......................... 202110437420.6

(51) Int. Cl.
*H04N 21/8547*   (2011.01)
*G06N 3/045*   (2023.01)
*G06V 20/40*   (2022.01)
*G06V 40/16*   (2022.01)
(Continued)

(52) U.S. Cl.
CPC ......... *H04N 21/8547* (2013.01); *G06N 3/045* (2023.01); *G06V 20/46* (2022.01);
(Continued)

(58) Field of Classification Search
CPC .......... G06N 3/045; G06N 3/047; G06N 3/08; G06N 3/088; G11B 27/031; G11B 27/10;
(Continued)

(56) References Cited

U.S. PATENT DOCUMENTS 11,218,668 B2 *    1/2022   Mireles .................. H04N 7/147

FOREIGN PATENT DOCUMENTS

CN    107509110 A    12/2017
CN    110324718 A    10/2019
(Continued)

OTHER PUBLICATIONS

First Office action issued in related Chinese Application No. 202110437420.6, dated Oct. 19, 2021, 14 pages.
(Continued)

*Primary Examiner* — Omar S Parra
(74) *Attorney, Agent, or Firm* — BAYES PLLC (57) ABSTRACT

Systems and methods for generating a synthetic video based on an audio are provided. An exemplary system may include a memory storing computer-readable instructions and at least one processor. The processor may execute the computer-readable instructions to perform operations. The operations may include receiving a reference video including a motion picture of a human face and receiving the audio including a speech. The operations may also include generating a synthetic motion picture of the human face based on the reference video and the audio. The synthetic motion picture of the human face may include a motion of a mouth of the human face presenting the speech. The motion of the mouth may match a content of the speech. The operations may further include generating the synthetic video based on the synthetic motion picture of the human face.

20 Claims, 5 Drawing Sheets

(51) Int. Cl.
*G11B 27/031* (2006.01)
*G11B 27/10* (2006.01)
*H04N 21/845* (2011.01)

(52) U.S. Cl.
CPC .......... *G06V 40/165* (2022.01); *G11B 27/031* (2013.01); *G11B 27/10* (2013.01); *H04N 21/8456* (2013.01)

(58) Field of Classification Search
CPC ....... G11B 27/28; G06T 13/205; G06T 13/40; G06V 20/46; G06V 40/165; G10H 1/0008; G10H 1/368; G10H 2220/005; G10H 2240/325; G10L 2021/105; G10L 21/10; H04N 21/44016; H04N 21/4415; H04N 21/8456; H04N 21/854; H04N 21/8547

See application file for complete search history.

(56) References Cited

FOREIGN PATENT DOCUMENTS

| | | | | |
|---|---|---|---|---|
| CN | 112562721 A | | 3/2021 | |
| CN | 112866586 A | * | 5/2021 | ............ G10L 13/047 |
| CN | 114424577 A | * | 4/2022 | ............ G06F 16/739 |
| KR | 102116309 | * | 5/2020 | ............ G10L 21/055 |
| WO | WO-2020150688 A1 | * | 7/2020 | ......... G06K 9/00248 |

OTHER PUBLICATIONS

Second Office action issued in related Chinese Application No. 202110437420.6, dated Dec. 28, 21 pages.

Third Office action issued in related Chinese Application No. 202110437420.6, dated Mar. 14, 10 pages.

* cited by examiner

SYSTEMS AND METHODS FOR GENERATING SYNTHETIC VIDEOS BASED ON AUDIO CONTENTS

CROSS-REFERENCE TO RELATED APPLICATION

The present application claims the benefits of priority to Chinese Application No. 202110437420.6, filed on Apr. 22, 2021. The entire contents of the above-identified application are expressly incorporated herein by reference.

TECHNICAL FIELD

The present application relates to synthetic video generation. More specifically, the present application relates to systems and methods for generating synthetic videos based on audio contents.

BACKGROUND

With the development of Internet and mobile device technologies, multimedia contents have gained popularity in communicating information to customers. For example, in real estate sales, online audio and video advertising gradually replaces conventional methods based on distributing paper pamphlets and posting advertisement through newspaper. While audio and video contents are more appealing, they are relatively difficult to mass produce. Technologies such as text-to-speech (TTS) can generate synthetic audios from text information using computer systems. However, it is challenging to generate synthetic videos in a similar manner.

Embodiments of the present disclosure improve user experience in consuming multimedia contents especially in the context of exploring and virtually touring real estate properties by automatically generating synthetic videos that include motion pictures matching the contents of recorded or synthetic audios, thereby providing a more intuitive communication approach.

SUMMARY

In one aspect, a system for generating a synthetic video based on an audio is provided. The system may include a memory storing computer-readable instructions and at least one processor communicatively coupled to the memory. The computer-readable instructions, when executed by the at least one processor, may cause the at least one processor to perform operations. The operations may include receiving a reference video including a motion picture of a human face and receiving the audio including a speech. The operations may also include generating a synthetic motion picture of the human face based on the reference video and the audio. The synthetic motion picture of the human face may include a motion of a mouth of the human face presenting the speech. The motion of the mouth may match a content of the speech. The operations may further include generating the synthetic video based on the synthetic motion picture of the human face.

In another aspect, a method for generating a synthetic video based on an audio is provided. The method may include receiving a reference video including a motion picture of a human face and receiving the audio including a speech. The method may also include generating a synthetic motion picture of the human face based on the reference video and the audio. The synthetic motion picture of the human face may include a motion of a mouth of the human face presenting the speech. The motion of the mouth may match a content of the speech. The method may further include generating the synthetic video based on the synthetic motion picture of the human face.

In yet another aspect, a non-transitory computer-readable medium storing computer-readable instructions is provided. The computer-readable instructions, when executed by at least one processor, may cause the at least one processor to perform a method for generating a synthetic video based on an audio. The method may include receiving a reference video including a motion picture of a human face and receiving the audio including a speech. The method may also include generating a synthetic motion picture of the human face based on the reference video and the audio. The synthetic motion picture of the human face may include a motion of a mouth of the human face presenting the speech. The motion of the mouth may match a content of the speech. The method may further include generating the synthetic video based on the synthetic motion picture of the human face.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Embodiments of the present disclosure provide systems, methods, and computer-readable media for generating synthetic videos based on audios. For example, a generated synthetic video may include a synthetic motion picture of a human face presenting a speech, where the motion of the mouth matches the contents of a corresponding audio description. As used herein, a motion picture refers to an animated pictorial image without audio accompaniment, while a video refers to a motion picture or a motion picture with audio accompaniment. In other words, a motion picture is a video without audio, while a video may or may not include audio. In general, audio contents are relatively easy to create, for example by recording or using TTS technology to synthetic audio from text information. Embodiments of the present disclosure can enrich the audio contents by adding accompanying motion pictures to the audio contents to generate video contents. The video contents can have matching motion pictures and audio descriptions, greatly increasing the efficiency of content creation.

While technologies disclosed herein can be used in various applications, in the following passages several embodiments will be described in the context of providing real estate sales information to potential buyers or customers. It is noted that the following descriptions are exemplary in nature and not limiting. The synthetic video generation techniques disclose herein can be used in other areas as well.

Figure 1:
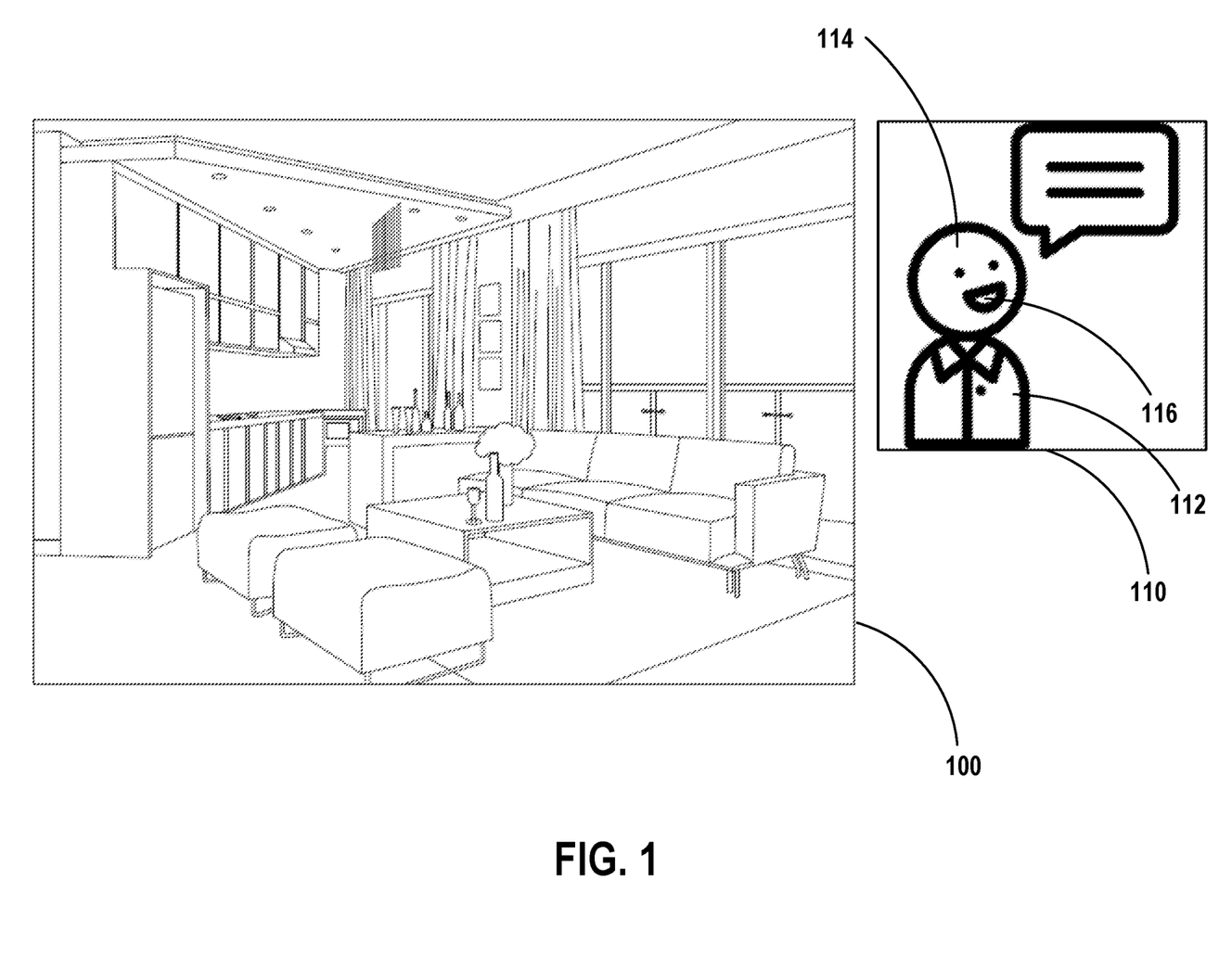
FIG. 1 illustrates an exemplary application of synthetic video generation, according to embodiments of the disclosure.

FIG. 1 illustrates an exemplary application utilizing the synthetic video generation techniques disclosed herein. As shown in FIG. 1, an image 100 may be displayed on a display device (e.g., a monitor, a screen, a mobile device, etc.). Image 100 may depict a room that is part of a real estate property for sale or rent. Image 100 may be in the form of a two-dimensional (2D) picture, a video recording, a three-dimensional (3D) model such as a virtual reality (VR) model, or other types of media showcasing the real estate property. Image 100 may be accompanied by a video 110 introducing or explaining features of the real estate property. Video 110 may be placed in a separate location from image 100, as shown in FIG. 1, or may be partially or entirely overlapped with image 100. Video 110 may feature a person 112, such as a realtor, presenting a speech relevant to the real estate property. Video 110 may show the face 114 of person 112, with the mouth 116 of person 112 moving according to the contents of the speech. Traditionally, to show a real person instead of a virtual one (e.g., an avatar), video 110 needs to be recorded while person 112 is giving the speech, which is time consuming. Embodiments of the present disclosure can synthesize video 110 based on a reference video (e.g., a template) and audio contents specific to individual real estate properties using computer systems and machine learning technologies, thereby increasing the efficiency of video content production.

Figure 2:
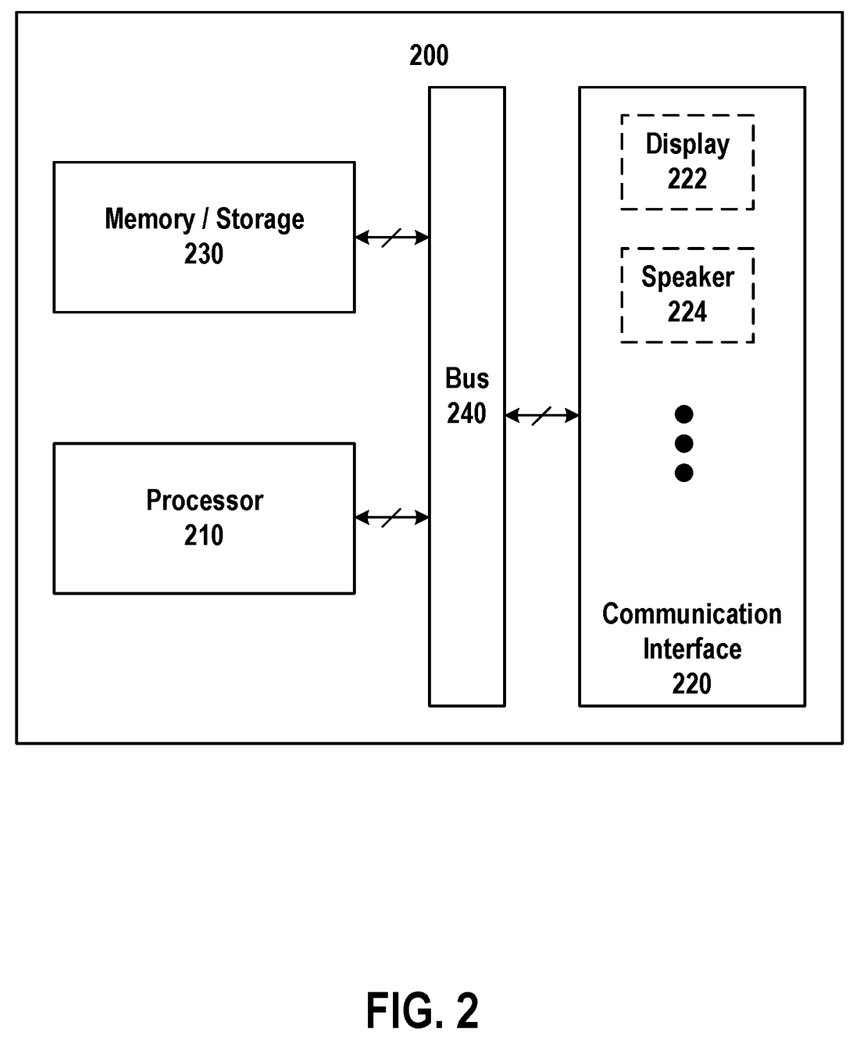
FIG. 2 illustrates a block diagram of an exemplary system for generating synthetic videos, according to embodiments of the disclosure.

FIG. 2 illustrates a block diagram of an exemplary computer system 200 configured to implement various aspects of the synthetic video generation technique disclosed herein. Computer system 200 may be configured as a server, a workstation, or a terminal device such as a mobile device. As shown in FIG. 2, computer system 200 may include a processor 210, a communication interface 220, a memory/storage 230, and a data bus 240. Memory/storage 230 may be configured to store computer-readable instructions that, when executed by processor 210, can cause processor 210 to perform various operations disclosed herein. Memory 230 may include any non-transitory type of storage devices, such as volatile or non-volatile, magnetic, semiconductor-based, tape-based, optical, removable, non-removable, or other types of storage devices, and/or tangible computer-readable media including, but not limited to, a read-only memory (ROM), a flash memory, a dynamic random-access memory (RAM), a static RAM, a hard drive, and a solid-state drive (SSD).

Processor 210 may be configured to perform operations in accordance with the instructions stored in memory 230. Processor 210 may include any appropriate type of general-purpose or special-purpose microprocessors, digital signal processors, microcontrollers, or the like. Processor 210 may be configured as a separate processor module dedicated to performing one or more specific operations disclosed herein. Alternatively, processor 210 may be configured as a shared processor module capable of performing other operations unrelated to the one or more specific operations disclosed herein. In some embodiments, multiple processors may be used to perform operations in a distributed and/or collaborated manner.

Communication interface 220 may be configured to communicate information between computer system 200 and other devices or systems. For example, communication interface 220 may include an integrated services digital network (ISDN) card, a cable modem, a satellite modem, or a modem to provide a data communication connection. As another example, communication interface 220 may include a local area network (LAN) adaptor to provide a data communication connection to a compatible LAN. As a further example, communication interface 220 may include a high-speed network adapter such as a fiber optic network adaptor, 10G Ethernet adaptor, or the like. Wireless links can also be implemented by communication interface 220. In such an implementation, communication interface 220 can send and receive electrical, electromagnetic, or optical signals that carry digital data streams representing various types of information via a network. The network can typically include a cellular communication network, a Wireless Local Area Network (WLAN), a Wide Area Network (WAN), or the like.

Communication interface 220 may also include various I/O devices such as a display 222, a speaker or speaker module 224, a microphone, a keyboard, a mouse, a touchpad, a touch screen, a camera, a biosensor, etc. A user may input data to and/or receive information from computer system 200 through communication interface 220.

Display 222 may be integrated as part of computer system 200 or may be provided as a separate device communicatively coupled to computer system 200. Display 222 may include a display device such as a Liquid Crystal Display (LCD), a Light Emitting Diode Display (LED), a plasma display, or any other type of display, and provide a Graphical User Interface (GUI) presented on the display for user input and data depiction. For example, display 222 may be used to display image 100 and video 110 shown in FIG. 1. In some embodiments, display device 222 may include a VR goggle, a pair of VR glasses, a VR headset or helmet, etc. which provide immersive VR experience. In some embodiments, display 222 may be integrated as part of communication interface 220.

Speaker (or speaker module) 224 may include any suitable audio output device. In some embodiments, speaker 224 may include an audio transducer to convert electrical signals to audio signals. In some embodiments, speaker 224 may take the form of a digital to analog converter to convert digital audio signals to analog signals, which can be further converted to audio signals by a separate audio transducer.

Data bus 240 may include any suitable communication medium configured to facilitate data exchange among components of computer system 200.

Figure 3:
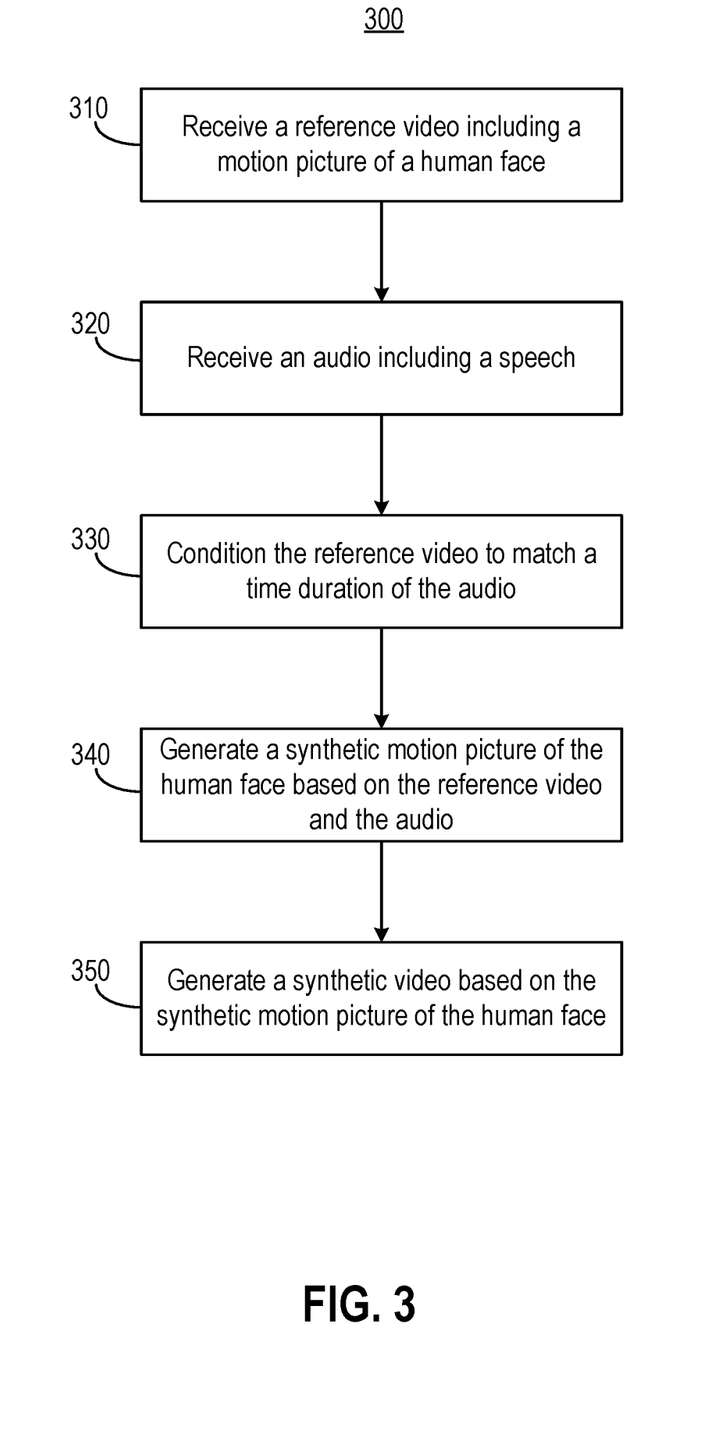
FIG. 3 illustrates a flowchart of an exemplary method for generating a synthetic video, according to embodiments of the disclosure.

FIG. 3 illustrates a flowchart of an exemplary method 300 for generating a synthetic video, according to embodiments of the disclosure. Method 300 may be performed by computer system 200. For example, instructions for performing method 300 may be stored in memory 230 and executed by processor 210. As shown in FIG. 3, method 300 may include multiple steps as described below. It is to be appreciated that some of the steps may be optional or can be omitted. Further, some of the steps may be performed simultaneously, or in a different order than that shown in FIG. 3.

In step 310, processor 210 may receive a reference video including a motion picture of a human face. The reference video may be pre-recorded and used as a template for generating a plurality of synthetic videos. For example, the reference video may include a person, such as a realtor, acting naturally while making a normal speech or conversation. The purpose of the reference video is to capture the facial expression, eye blinking, gentle body/face movement, or other similar features that naturally occur during speaking. It is not necessary for the person to speak during the recording of the reference video because the motion of the mouth will be replaced according to specific audio contents during the generation of the synthetic video. Therefore, in the reference video the person may smile or keep the mouth closed. The reference video may last for a first time duration, for example, about 10 seconds. The reference video may show a motion picture of the face of the person being recorded. The motion picture of the face may include, for example, facial expression, micro expression, eye blinking, face/head/body movement, or other motions or features on the face of the person.

In step 320, processor 210 may receive an audio including a speech. The audio may be recorded or synthesized from text information. For example, the audio may include a speech about features of a specific real estate property, such as an introduction of the room shown in image 100 of FIG. 1. The audio may last for a second time duration, which may or may not be the same as the first time duration of the reference video.

Figure 4:
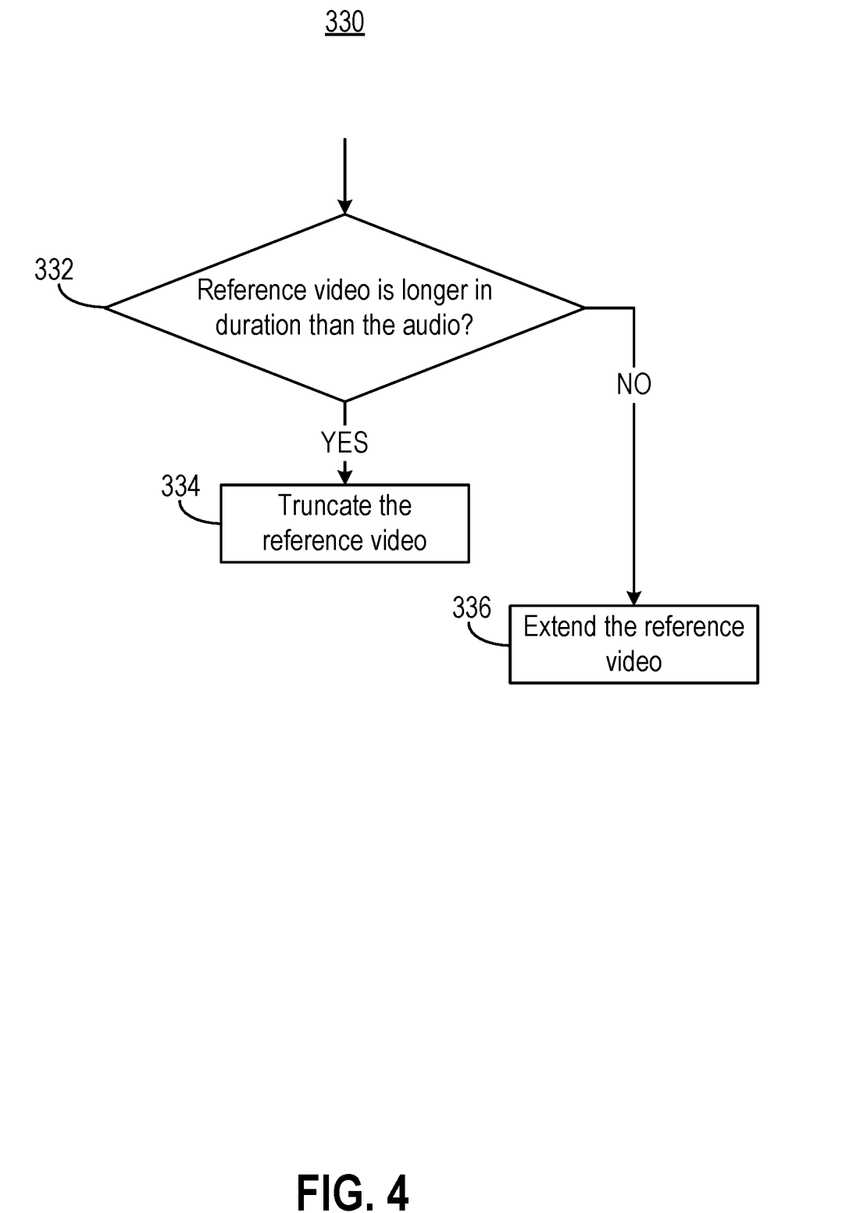
FIG. 4 illustrates a flow chart of an exemplary method for conditioning a reference video, according to embodiments of the disclosure.

In step 330, processor 210 may condition the reference video to match the time duration of the audio. Because the reference video is pre-recorded with a set time duration, the reference video may be longer or shorter in duration than that of the audio. Processor 210 may condition the reference video to be the same or about the same length in duration as the audio. FIG. 4 shows an exemplary implementation of step 330. As shown in FIG. 4, processor 210 may determine whether the reference video is longer in duration than the audio in step 332. If so, the process proceeds along the YES branch to step 334, in which processor 210 may truncate the reference video to be the same or about the same length in duration as that of the audio. For example, processor 210 may select a portion of the reference video having the same length in duration as the audio and remove the rest. Processor 210 may select the portion of the reference video from the beginning of the reference video or from any time point, as long as the selected portion matches the time duration of the audio. On the other hand, if processor 210 determines that the reference video is not longer in duration than the audio, the process proceeds along the NO branch to step 336, in which processor 210 may extend the reference video with a duplication of at least a portion of the reference video. For example, processor 210 may extend the reference video by replaying the reference video from the beginning (or any time point of the reference video) whenever reaching the end of the reference video (or any time point of the reference video) until the total time duration matches that of the audio. In another example, processor 210 may extend the reference video by playing the reference video forward then backward then forward again, etc., until the total time duration matches that of the audio. Again, the time point at which the forward/backward playing switches can be any time point of the reference video. Therefore, the duplication of the reference video includes both forward duplication as well as backward duplication. In addition, processor 210 may set any time point of the reference video as the starting point of the extended reference video. It is noted that step 330 is performed when there is a mismatch between the time durations of the reference video and the audio. If the reference video has the same length in duration as the audio, step 330 may be skipped.

Referring back to FIG. 3, method 300 proceeds to step 340, in which processor 210 may generate a synthetic motion picture of the human face based on the reference video and the audio. The synthetic motion picture of the human face may include a motion of the mouth of the human face presenting the speech of the audio. The motion of the mouth may match the content of the speech. For example, the synthetic motion picture may combine the facial expression and other features of the face with a synthetic motion picture of the mouth moving in accordance with the content of the speech to provide a video as if the person is presenting the speech.

Figure 5:
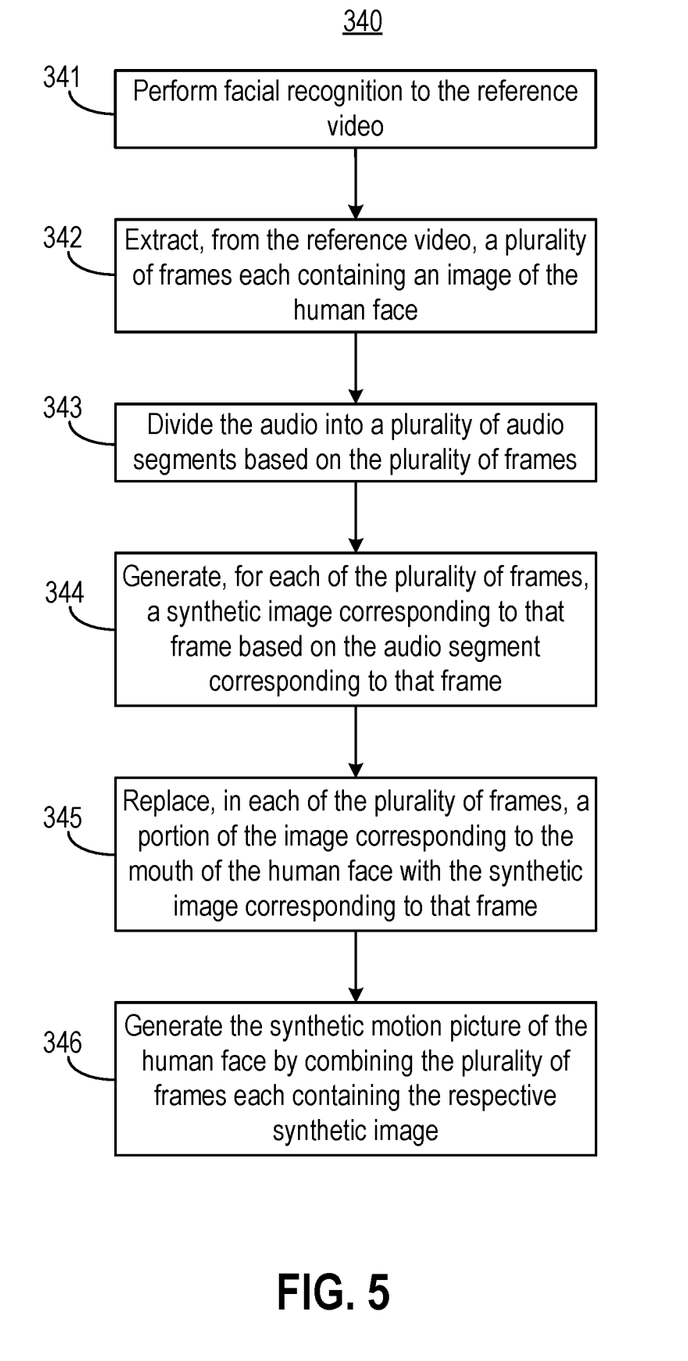
FIG. 5 illustrates an exemplary method for generate a synthetic motion picture of a human face based on a reference video and an audio, according to embodiments of the disclosure.

FIG. 5 shows an exemplary implementation of step 340. As shown in FIG. 5, in step 341, processor 210 may perform facial recognition to the reference video to identify the face of the person in the reference video. Any suitable facial recognition method may be used in step 341 as long as the image of the face can be identified. Based on the facial recognition, the image of the face can be separated from other parts of the reference video, such as the background. This may improve the accuracy of video synthesis in later steps.

In step 342, processor 210 may extract, from the reference video, a plurality of frames each containing an image of the human face. For example, based on the facial recognition result of step 341, processor 210 may separate the image of the face from other parts of the reference video, and extract the image of the face as a plurality of frames. As used herein, a frame refers to a 2D image as part of the reference video. In some embodiments, each frame may contain only the image of the face with other parts removed. In other embodiments, each frame may contain the image of the face as well as at least some non-facial parts. In any case, processor 210 may extract the plurality of frames containing the image of the face from the reference video for video synthesis.

In step 343, processor 210 may divide the audio into a plurality of audio segments based on the plurality of frames. For example, when there are N frames, processor 210 may divide the audio into N audio segments such that each audio segment corresponds to one frame. In some embodiments, processor 210 may divide the audio into equal-length audio segments, where each audio segment may have a time span of, for example, 50 milliseconds (ms). In some embodiments, adjacent audio segments may have overlapping portions. For example, audio segment A may span from (e.g., in terms of the time points of the audio) 50 ms to 110 ms, audio segment B next to A may span from 100 ms to 160 ms, and audio segment C next to B may span from 150 ms to 210 ms, etc. Such overlapping may improve the continuity of the motion of the mouth in the resulting synthetic video.

When the audio is in the form of a time-domain signal, such as in the form of an audio waveform, processor 210 may perform Fourier transform to the time-domain signal within a time window to convert it to a frequency-domain signal, and then extract the mel-frequency cepstral coefficients (MFCCs) as the audio features corresponding to the time-domain signal within the time window. The audio features may be used for video synthesis. The time window used for performing the Fourier transform may be used to determine the time span for dividing the audio into audio segments. For example, each audio segment may have a time span equal to the Fourier transform time window.

In step 344, processor 210 may generate, for each of the plurality of frames, a synthetic image corresponding to that frame based on the audio segment corresponding to that frame. The synthetic image may include a shape of the mouth matching a content of the audio segment. The synthetic image may correspond to the mouth region and mimic the mouth shape when speaking the content of the audio segment. Because each audio segment is relatively short (e.g., about 50 ms), the mouth shape corresponding to speaking the content of such an audio segment can be relatively set. The mapping relationship between an audio segment and a mouth shape can be determined through a neural network trained with a large amount of matching audio segments and mouth shapes.

For example, processor 210 may process, for each of the plurality of frames, the image of the human face corresponding to that frame and the audio segment corresponding to that frame using a neural network generator to generate the synthetic image corresponding to that frame. The neural network generator can be trained in a generative adversarial network (GAN) including the neural network generator and a discriminator using a plurality of training samples. Each of the training samples may include a training audio segment and a corresponding training human face image containing a mouth shape matching a content of the training audio segment. In some embodiments, the training human face image may include only the mouth region. During training, the neural network generator may generate a human face image based on a training audio segment. The generated human face image can be input into the discriminator to determine whether the input is a generated human face image or a training human face image. The discriminator and the neural network generator can be cross trained iteratively in this manner until a certain condition is met, for example, the discriminator can no longer differentiate the generated human face image from the training human face image. In this way, the neural network generator can be trained to generate a realistic human face image corresponding to an input audio segment, where the mouth shape of the human face image matches the content of the input audio segment.

In step 345, processor 210 may replace, in each of the plurality of frames, a portion of the image corresponding to the mouth of the human face with the synthetic image corresponding to that frame. For example, processor 210 may replace the mouth region of each frame with the synthetic image of the mouth having a shape of speaking the content of the corresponding audio segment. In this way, the mouth region of each frame can be replaced with a synthetic mouth image mimicking the shape of the mouth when speaking the content of the corresponding audio segment.

In step 346, processor 210 may generate the synthetic motion picture of the human face by combining the plurality of frames each containing the respective synthetic image. For example, the synthetic motion picture of the human face can be generated by combining individual frames each having the mouth region replaced with the corresponding synthetic image. The sequence of the combined frame may then form the synthetic motion picture. Because the mouth region has been replaced in each individual frame, the collection of the replaced mouth region can form the motion of the mouth as if the person is presenting the speech, with the variations of the mouth shape matching the content of the speech.

Referring back to FIG. 3, method 300 proceeds to step 350, in which processor 210 may generate a synthetic video based on the synthetic motion picture of the human face. For example, processor 210 may combine the synthetic motion picture of the human face and the audio to generate the synthetic video. In this way, the synthetic video can have matching audio and synthetic mouth motion, together with realistic facial expressions and other features inherited from the reference video.

Another aspect of the disclosure is directed to a non-transitory computer-readable medium storing instruction which, when executed, cause one or more processors to perform the methods, as discussed above. The computer-readable medium may include volatile or non-volatile, magnetic, semiconductor-based, tape-based, optical, removable, non-removable, or other types of computer-readable media or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

The invention claimed is:

1. A system for generating a synthetic video based on an audio, comprising:
   a memory storing computer-readable instructions; and
   at least one processor communicatively coupled to the memory, wherein the computer-readable instructions, when executed by the at least one processor, cause the at least one processor to perform operations comprising:
   receiving a reference video comprising a motion picture of a human face;
   receiving the audio comprising a speech describing a real property, the audio being recorded at a different occasion from the reference video;
   generating a synthetic motion picture of the human face based on the reference video and the audio, wherein the synthetic motion picture of the human face comprises a sequence of synthetic images simulating a motion of a mouth of the human face, each synthetic image temporally corresponding to a content of an audio segment of the received audio, wherein the synthetic image is generated based on an image of the motion picture of the human face and temporally-corresponding time-domain signals extracted from the received audio to match a content of the speech describing the real property; and
   generating the synthetic video showing a person describing the real property based on the synthetic motion picture of the human face.

2. The system of claim 1, wherein the operations comprise:
   conditioning the reference video to match a time duration of the audio.

3. The system of claim 2, wherein conditioning the reference video to match the time duration of the audio comprises:
   truncating the reference video when the reference video is longer in duration than the audio; and
   extending the reference video with a duplication of at least a portion of the reference video when the reference video is shorter in duration than the audio.

4. The system of claim 1, wherein the operations comprise:
- extracting, from the reference video, a plurality of frames each containing an image of the human face;
- replacing, in each of the plurality of frames, a portion of the image corresponding to the mouth of the human face with a synthetic image corresponding to that frame; and
- generating the synthetic motion picture of the human face by combining the plurality of frames each containing the respective synthetic image.

5. The system of claim 4, wherein the operations comprise:
- dividing the audio into a plurality of audio segments based on the plurality of frames, each of the plurality of audio segments corresponding to one of the plurality of frames; and
- generating, for each of the plurality of frames, the synthetic image corresponding to that frame based on the audio segment corresponding to that frame, the synthetic image comprising a shape of the mouth matching a content of the audio segment.

6. The system of claim 5, wherein the operations comprise:
- processing, for each of the plurality of frames, the image of the human face corresponding to that frame and the audio segment corresponding to that frame using a neural network generator to generate the synthetic image corresponding to that frame.

7. The system of claim 6, wherein:
- the neural network generator is trained in a generative adversarial network comprising the neural network generator and a discriminator using a plurality of training samples, each of the plurality of training samples comprising a training audio segment and a corresponding training human face image containing a mouth shape matching a content of the training audio segment.

8. The system of claim 4, wherein the operations comprise:
- performing facial recognition to the reference video to extract the plurality of frames.

9. The system of claim 1, wherein the operations comprise:
- generating the synthetic video by combining the synthetic motion picture of the human face and the audio.

10. The system of claim 1, wherein the speech comprises a presentation of a real estate property.

11. A method for generating a synthetic video based on an audio, the method comprising:
- receiving a reference video comprising a motion picture of a human face;
- receiving the audio comprising a speech describing a real property, the audio being recorded at a different occasion from the reference video;
- generating a synthetic motion picture of the human face based on the reference video and the audio, wherein the synthetic motion picture of the human face comprises a sequence of synthetic images simulating a motion of a mouth of the human face, each synthetic image temporally corresponding to a content of an audio segment of the received audio, wherein the synthetic image is generated based on an image of the motion picture of the human face and temporally-corresponding time-domain signals extracted from the received audio to match a content of the speech describing the real property; and
- generating the synthetic video showing a person describing the real property based on the synthetic motion picture of the human face.

12. The method of claim 11, comprising:
- conditioning the reference video to match a time duration of the audio.

13. The method of claim 12, wherein conditioning the reference video to match the time duration of the audio comprises:
- truncating the reference video when the reference video is longer in duration than the audio; and
- extending the reference video with a duplication of at least a portion of the reference video when the reference video is shorter in duration than the audio.

14. The method of claim 11, comprising:
- extracting, from the reference video, a plurality of frames each containing an image of the human face;
- replacing, in each of the plurality of frames, a portion of the image corresponding to the mouth of the human face with a synthetic image corresponding to that frame; and
- generating the synthetic motion picture of the human face by combining the plurality of frames each containing the respective synthetic image.

15. The method of claim 14, comprising:
- dividing the audio into a plurality of audio segments based on the plurality of frames, each of the plurality of audio segments corresponding to one of the plurality of frames; and
- generating, for each of the plurality of frames, the synthetic image corresponding to that frame based on the audio segment corresponding to that frame, the synthetic image comprising a shape of the mouth matching a content of the audio segment.

16. The method of claim 15, comprising:
- processing, for each of the plurality of frames, the image of the human face corresponding to that frame and the audio segment corresponding to that frame using a neural network generator to generate the synthetic image corresponding to that frame.

17. The method of claim 16, wherein:
- the neural network generator is trained in a generative adversarial network comprising the neural network generator and a discriminator using a plurality of training samples, each of the plurality of training samples comprising a training audio segment and a corresponding training human face image containing a mouth shape matching a content of the training audio segment.

18. The method of claim 14, comprising:
- performing facial recognition to the reference video to extract the plurality of frames.

19. The method of claim 11, comprising:
- generating the synthetic video by combining the synthetic motion picture of the human face and the audio.

20. A non-transitory computer-readable medium storing computer-readable instructions, wherein the computer-readable instructions, when executed by at least one processor, cause the at least one processor to perform a method for generating a synthetic video based on an audio, the method comprising:
- receiving a reference video comprising a motion picture of a human face;
- receiving the audio comprising a speech describing a real property, the audio being recorded at a different occasion from the reference video;

generating a synthetic motion picture of the human face based on the reference video and the audio, wherein the synthetic motion picture of the human face comprises a sequence of synthetic images simulating a motion of a mouth of the human face, each synthetic image temporally corresponding to a content of an audio segment of the received audio, wherein the synthetic image is generated based on an image of the motion picture of the human face and temporally-corresponding time-domain signals extracted from the received audio to match a content of the speech describing the real property; and generating the synthetic video showing a person describing the real property based on the synthetic motion picture of the human face.

* * * * *